United States Patent [19]

Hall

[11] Patent Number: 5,593,271

[45] Date of Patent: Jan. 14, 1997

[54] CONVERTIBLE BARROW FOR GROUND LEVEL LOADING

[76] Inventor: John R. Hall, 38 Willow La., New Hartford, Conn. 06057

[21] Appl. No.: 630,342

[22] Filed: Apr. 10, 1996

[51] Int. Cl.$^6$ ...................................................... B62B 1/04
[52] U.S. Cl. ............................ 414/490; 298/2; 280/43.1; 280/47.21; 280/47.29; 280/43; 414/446
[58] Field of Search ...................................... 414/498, 490, 414/475, 476, 444, 446; 298/2, 3, 5, 6; 254/2 R; 280/30, 43, 47.23, 47, 43.1, 47.29, 43.11, 43.17, 47.12, 47.131, 47.17, 47.18, 47.21, 47.3, 47.315, 63, 64, 111

[56] References Cited

U.S. PATENT DOCUMENTS

| | | | |
|---|---|---|---|
| 87,939 | 3/1869 | Ingraham | 280/47.29 |
| 863,275 | 8/1907 | Haffey | 280/47.21 |
| 2,096,994 | 10/1937 | Millen | 280/47.21 |
| 2,374,982 | 5/1945 | Davies | 280/47.29 |
| 3,021,625 | 2/1962 | Stasse | 298/2 X |
| 4,062,591 | 12/1977 | Harris et al. | 298/2 |
| 4,735,424 | 4/1988 | Stelter, III | 280/47.21 |
| 4,756,540 | 7/1988 | Crawford | 280/47.21 |
| 4,762,333 | 8/1988 | Mortenson | 280/43.1 |

FOREIGN PATENT DOCUMENTS 973445  2/1951  France .................. 280/47.21

OTHER PUBLICATIONS

Damark International, Inc. catalog, Item No. B-7532-463256, p. 24.

*Primary Examiner*—Frank E. Werner

[57] ABSTRACT

A ground-loading conveyance for refuse or heavy objects. The frame is tipped with the handle to allow a two wheel carriage on pivoting support legs to swing beneath the frame, so as to support the load for transporting.

14 Claims, 4 Drawing Sheets

5,593,271

CONVERTIBLE BARROW FOR GROUND LEVEL LOADING

This invention relates generally to wheeled vehicles for transporting loads and more particularly to transport dollys or barrows suitable for ground level loading.

BACKGROUND OF THE INVENTION

Various types of hand operated trucks, barrows, dollys or other wheeled vehicles are known for assistance in moving loads from one place to another. Some of the these vehicles have included special construction features to assist in loading the vehicle from ground level. One reason for doing this is when there is a very heavy load to be transported, effort is required to hoist it to the level of a transport platform or frame. Another reason for ground level loading exists in the case of a trash bin or collector where bulky or heavy material is gathered or swept into one end of a container, which must then be lifted onto a barrow or truck.

One prior art type of conveyance is a sackbarrow which is an L-shaped frame having a pair of wheels at the intersection of the L-shaped frame. One end of the frame terminates in handles. At the other end of the frame is a short loading platform resting at ground level. The load is transported by working the short loading platform beneath the load and then tilting the sackbarrow back on the wheels. Care is required to lift the load on the short loading platform without tipping the sackbarrow back onto the operator.

A variation of the sackbarrow is shown in U.S. Pat. No. 863,275, issued Aug. 13, 1907 to Haffey, wherein a separate wheel carriage is provided, which is supported on legs pivotably connected to the frame. The wheel carriage may thus be swung into a transporting position at the intersection of the L-shaped frame after the load is in position. The arrangement shown does not solve the problem of balancing the load with the possible danger of tipping toward the operator. Also there is no leverage provided for raising the load and hence the loading platform must be kept very short.

Another prior art wheeled vehicle for transport of open trays, boxes or other containers is shown in U.S. Pat. No. 2,374,982, issued May 1, 1945 to Davies. In this device, a modified sackbarrow with a fairly long front loading platform is provided with a supplementary loading platform which hooks to the frame for transporting and assists in loading and unloading. The supplementary platform acts as a load bearing member supported at one end by detachable hooks.

Another wheeled mechanism is shown in U.S. Pat. No. 4,756,540, issued to Crawford on Jul. 12, 1988, in which a wheel carriage is mounted at one end of a U-shaped frame, with an operating handle connected to the other end. A short ground level loading platform is supported on a pair of legs which are pivotably attached to the U-shaped frame. A cross member allows limited pivoting movement of the loading platform.

Other wheeled vehicles suitable for ground level loading are shown in U.S. Pat. No. 87,939 issued Mar. 16, 1869 to Ingraham, U.S. Pat. No. 2,096,994 issued Oct. 26, 1937 to Millen and U.S. Pat. No. 4,735,424 issued Apr. 5, 1988 to Stelter.

While the foregoing devices known in the prior art have facilitated ground level loading, they still have the problem of providing a simple means for placing the wheel carriage directly under the load for ease of balance and transporting, and in facilitating both the lifting of heavy objects, as well as collecting bulky materials at ground level.

Accordingly, one object of the present invention is to provide an improved convertible transport dolly or barrow adapted for loading heavy objects or bulky material at ground level, and then transporting them to another location.

Another object of the invention is to provide an improved and simplified wheeled vehicle adapted for ground level loading and transporting heavy objects employing wheels located directly beneath the center of gravity of the load.

DRAWING

The invention, both as to organization and method of practice, together with further objects and advantages thereof, will best be understood by reference to the following description, taken in connection with the accompanying drawings, in which:

FIG. 4 is the ground level loading position.

FIG. 5 shows an intermediate position in the conversion process,

FIG. 6 illustrates the barrow in a transporting mode,

FIG. 7 illustrates the ground loading position,

FIG. 8 shows an intermediate position during the conversion process,

FIG. 9 illustrates the barrow in a transporting mode, and

SUMMARY OF THE INVENTION

Briefly stated, the invention comprises a convertible transport dolly or barrow for ground level loading, comprising a frame having a substantially flat platform adapted for resting flat on the ground and receiving a load from substantially ground level to be transported, a handle having a pair of handle arms, each one of the handle arms being attached to the frame and extending upwardly and outwardly from the frame, the handle being adapted to be grasped by an operator so as to allow the operator tilt the platform to raise the end of the platform adjacent the operator, a wheel carriage having at least two wheels rotatably mounted thereon spaced apart greater than the width of the platform, and a pair of support legs each pivotably connected to the barrow at one end of the respective support legs and pivotably connected to the wheel carriage at the other end thereof, and spaced apart by a width greater than the width of the platform, the length of the support legs being such that the wheel carriage may rest on the ground beneath the handle when the platform is flat on the ground, but may swing beneath one raised end of the platform to a central support section of the platform, wherein the load is supported on the platform above the wheel carriage when transporting the load. The pivot points of the support legs are preferably adjustable, so as to adjust the wheel carriage position under the platform.

DESCRIPTION OF THE PREFERRED EMBODIMENT

Figure 1:
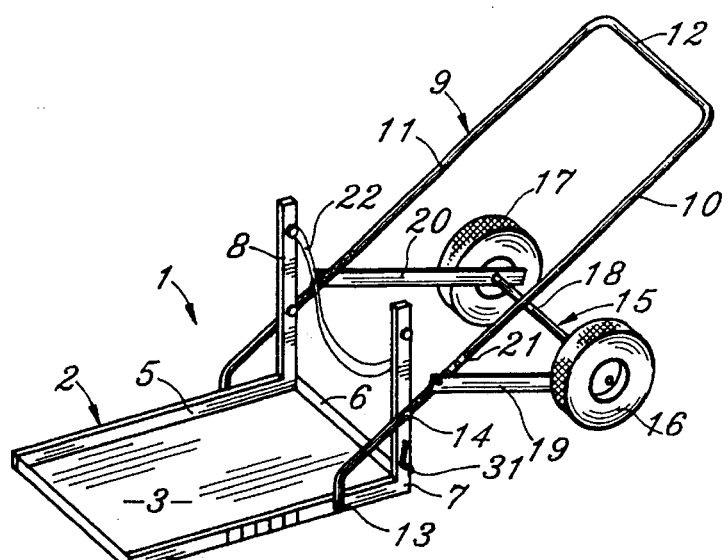
FIG. 1 is a perspective view of the convertible transport dolly or barrow.

Referring now to FIG. 1 of the drawing, the convertible transport dolly or barrow is indicated generally at 1 as comprising a frame 2 having a substantially flat platform 3. Platform 3 is carried between two longitudinal beams 4, 5 and a cross member 6. A pair of uprights 7, 8 are rigidly attached to extend orthogonally from longitudinal beams 4, 5 respectively. The type of construction of platform 3 is not material to the present invention, suitable platforms being constructed of sheet metal, wood or of open metal framework construction. Platform 3 must be capable, together with longitudinal beams 4, 5, of carrying the load when supported from beneath by a transverse member near the central section of the platform.

A handle 9, shown as a U-shaped member, having a pair of handle arms 10, 11 and a connecting cross member 12, is connected to frame 2. The means of connection, which is only exemplary of many possible attachments, is by means of bolts 13 connecting the ends of the handle arms 10, 11 to the respective beams 4, 5, and bolts 14 connecting the handle arms to the respective uprights 7, 8. The handle 9 extends upward and outward so that the cross member 12 may be grasped by the operator (not shown).

In order to transport the frame 2 and its load, a wheel carriage shown generally as 15 is provided, which comprises a pair of wheels 16, 17 rotatably mounted on an axle 18. Alternatively the wheel carriage 15 could comprise a rigid transverse frame with wheels rotatably mounted separately to the frame. The wheels are spaced apart greater than the width of platform 3 (including beams 4, 5).

In order to convert the loading platform to a transportable barrow, a pair of support legs 19, 20 are pivotably connected between the barrow and the carriage 15. In FIGS. 1–9, the pivotable connections are made to the arms 10, 11 of handle 9. Adjustment along the length of the handle arms 10, 11 of the upper pivot points of support legs 19, 20 is provided by a series of holes 21 allowing a selection to be made by placing a bolt or pin through the appropriate holes.

Lastly, a retaining strap, chain or cable 22 is attached between uprights 7, 8 with means to adjust its length for purposes to be explained.

Figure 2:
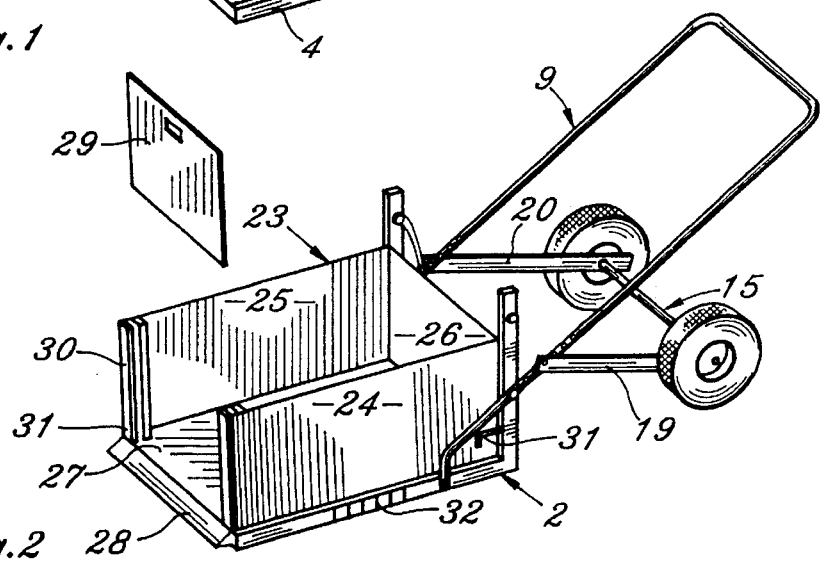
FIG. 2 is a similar perspective view incorporating a ground loading container disposed on the barrow.

Referring now to FIG. 2 of the drawing, frame 2, together with platform 3 are adapted to receive a container 23 adapted especially for the convertible barrow 1. Container 23 may be attached as a permanent part of frame 2, but preferably is a separate removable container. Container 23 is preferably open at the top with vertical side walls 24, 25, a backwall 26, a floor 27, a sweeping lip 28, and a removable gate 29. Gate 29 is vertically slidable between sidewalls 24, 25 in suitable channel members 30 so that it may be removed. In this manner, refuse can be swept or raked into container 23 facilitated by the sweeping lip 28 and then retained by gate 29 at a ground level position.

Figure 3:
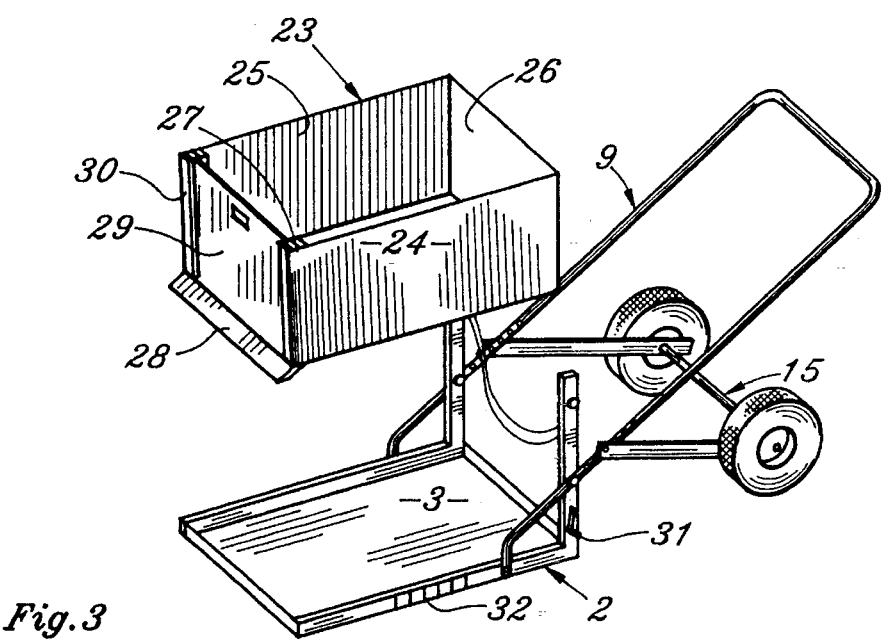
FIG. 3 is a perspective view showing the container separated from the barrow.

FIG. 3 illustrates the same view with container 23 shown removed from the frame 2, as a separate article, constructed of sheet metal walls or, alternatively, it could be a single piece molded plastic container with channels for gate 29 molded into the side walls. A peg and latch arrangement 31 serves as a retaining means to keep the container 23 from sliding from platform 3. Alternatively, the container 23 could be permanently attached to frame 2.

Lastly, index markings 32 may be scribed or painted on the longitudinal beams 4, 5 to indicate the final position of the wheel carriage, corresponding to the selected one of the adjustment holes 21 on the handle.

OPERATION

The convertible barrow may be used as a means for transporting heavy or bulky refuse in container 23 in the following manner.

Referring to FIG. 2, the container 23 is loaded at ground level by removing gate 29 and sweeping or raking refuse over lip 28 into the interior. Then gate 29 is inserted to close the end of container 23.

Figure 4:
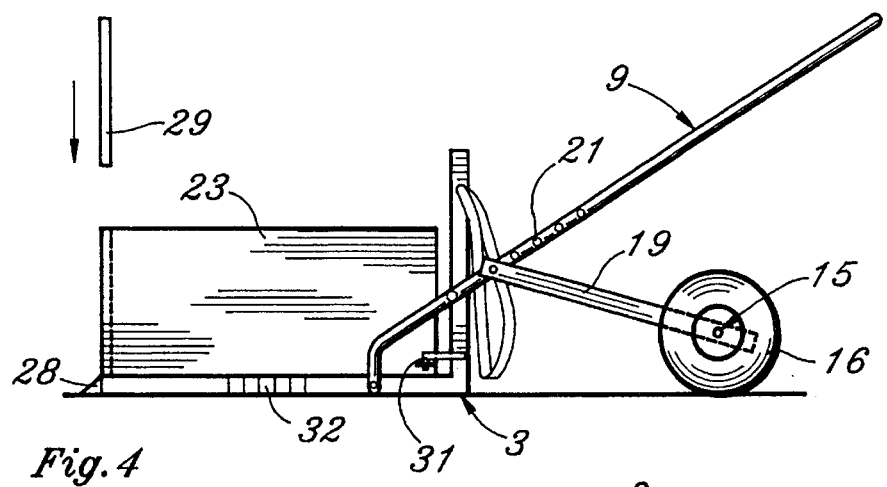
FIGS. 4–6 are simplified side elevational views illustrating the method of loading and converting the barrow from a loading position to a transporting position.

Referring to FIG. 4, the container 23 is shown being loaded at ground level, with gate 29 removed. The support legs 19, 20 allow the wheel carriage 15 to rest on the ground beneath handle 9, only one wheel 16 and one support leg 19 being visible in this view.

Figure 5:
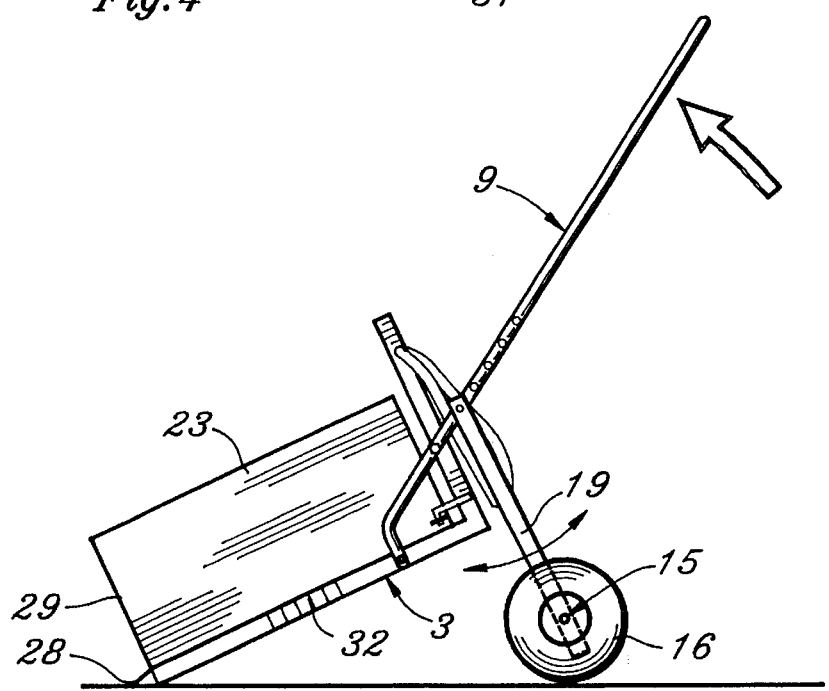

As shown in FIG. 5, the gate 29 has been closed. The operator elevates handle 9 in the direction of the arrow, allowing one end of frame 2 to raise off the ground. This allows wheel carriage 15 to swing clockwise beneath one raised end of the frame 2. The length of support legs 19 and 20 is such that wheel carriage 15 will end up in a central support section indicated generally by the markers 32. While the frame 2 is being tipped, the gate 29 and peg and latch 31 serve as retaining means to prevent the load from sliding off the barrow.

Figure 6:
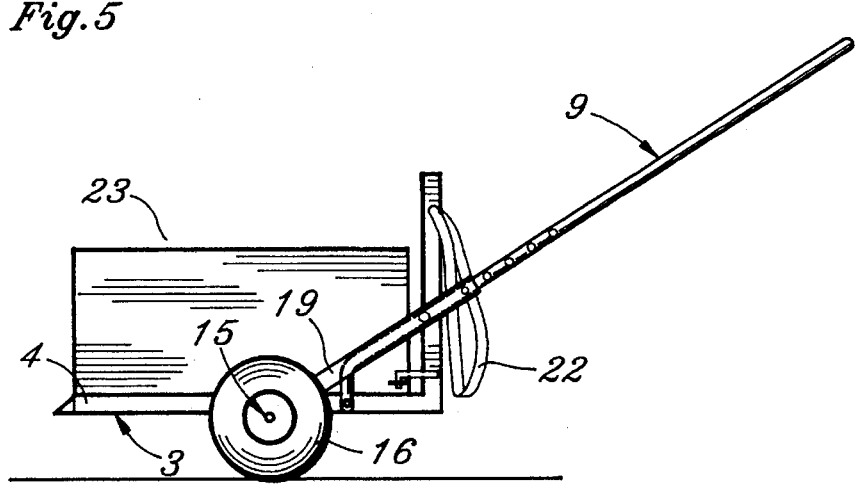

FIG. 6 illustrates the transport position. Container 23 and the load are supported on the platform 3, and the platform is supported on the wheel carriage 15 at a central support section of the platform designated by markers 32 (FIG. 5). The load may be carried entirely on the longitudinal beams 4, 5 to which the platform is attached, or entirely by the platform 3, or may be shared between the longitudinal beams and the platform.

The unloading procedure takes place in reverse fashion by lifting handle 9 to the position shown in FIG. 5, allowing the wheel carriage 15 to swing counterclockwise, and then lowering handle 9 so that the wheel carriage 15 assumes the position beneath handle 9 as shown in FIG. 4.

Figure 7:
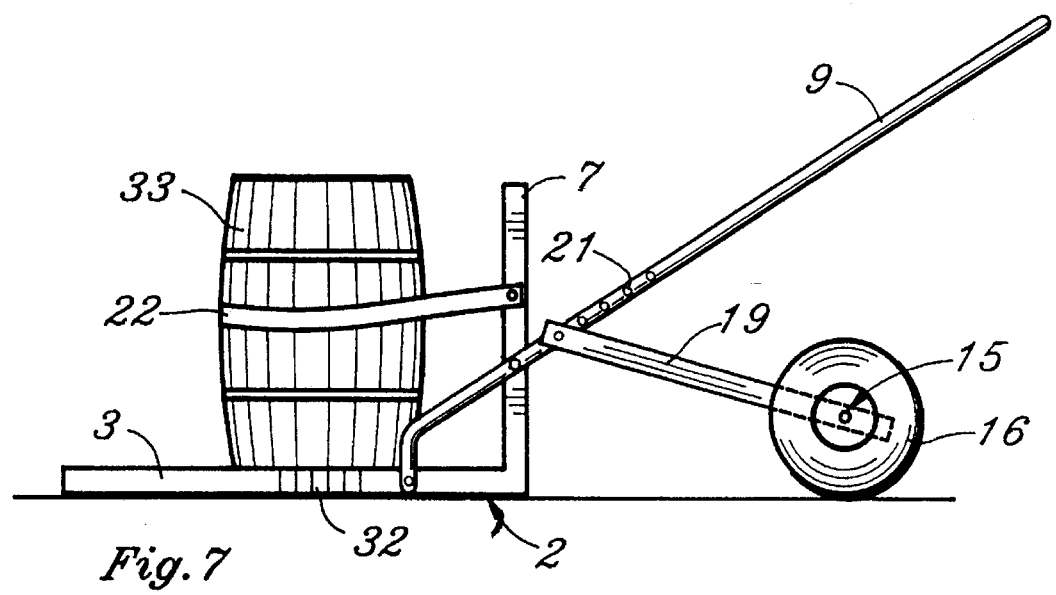
FIGS. 7–9 are simplified side elevational views of the barrow without a container and illustrating transporting a heavy load.
Figure 8:
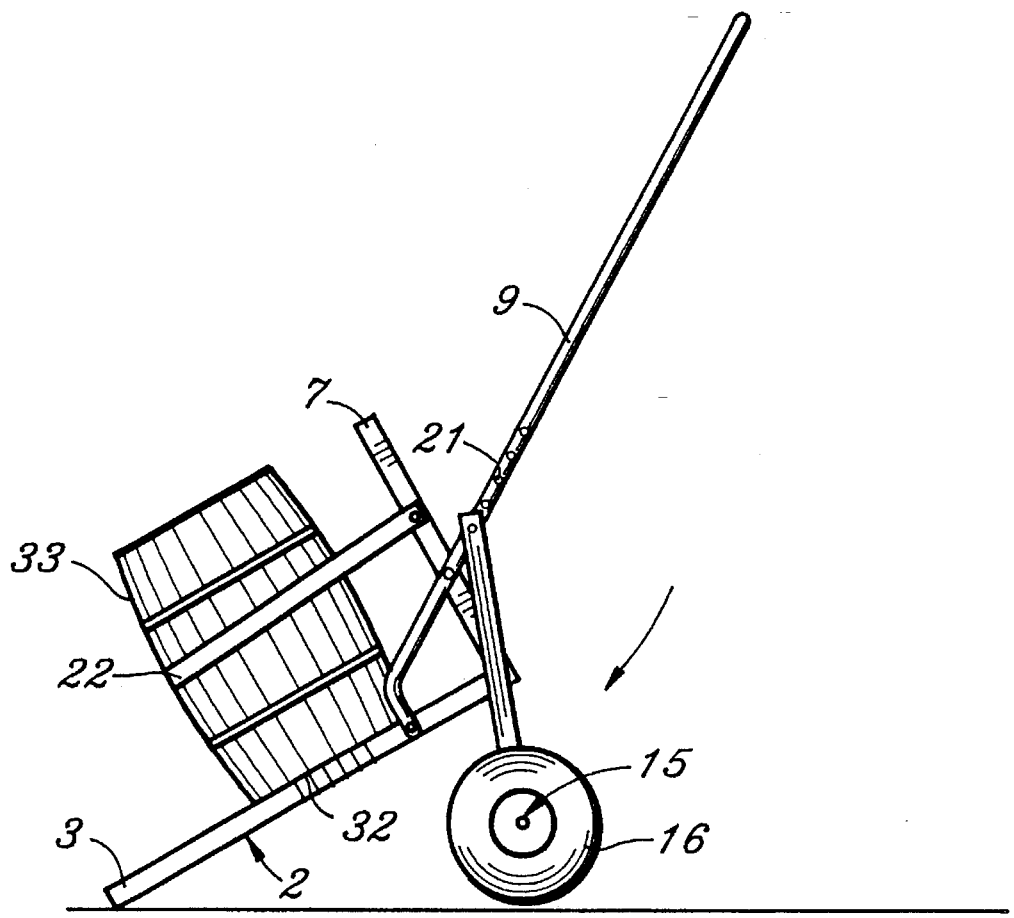
Figure 9:
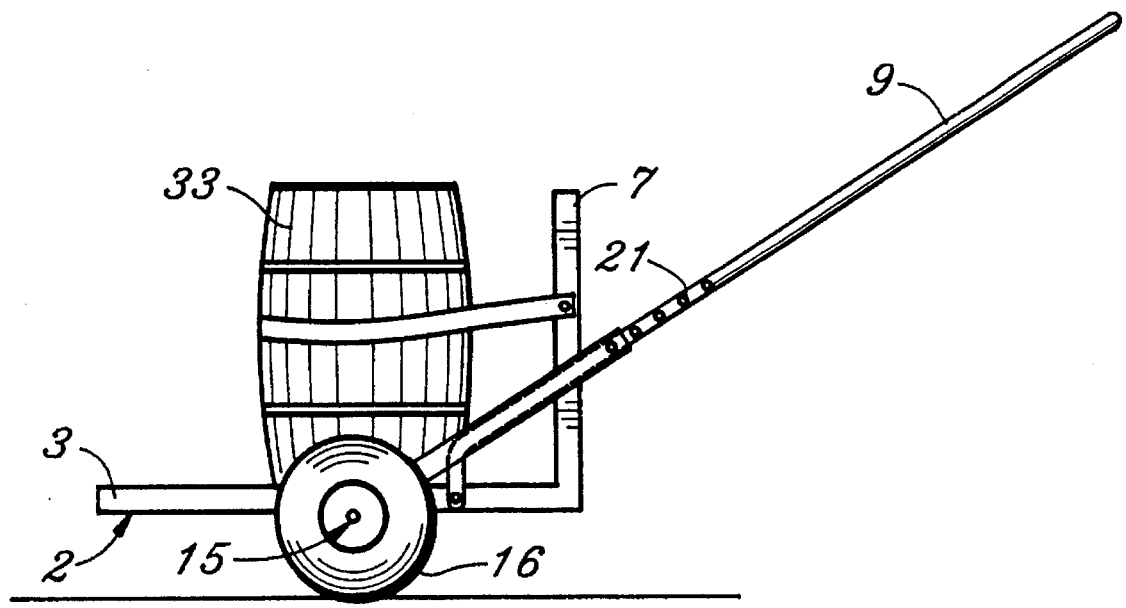

Reference to FIGS. 7, 8 and 9 show an alternate use of the invention to transport heavy loads on platform 3 which do not require a container. This method of operation requires use of the retaining strap 22 attached between uprights 7 and 8, only upright 7 being visible in FIGS. 7–9. FIGS. 7–9 show a heavy load, such as a drum 33, which is to be transported. Frame 2 is shown at ground level in FIG. 7 and the drum 33 may be moved into position with its center of gravity above a selected marker 32. The pivotable support legs 19, 20 are set by selecting the appropriate hole 21 on the arms of handle 9 corresponding to one of the markers 32. The retaining strap 22 is positioned around drum 33 and tightened.

FIG. 8 illustrates the intermediate conversion position. Handle 9 is elevated allowing wheel carriage 15 to swing beneath the platform 3 as before. When the frame 2 is tipped, the retaining strap 22 prevents drum 33 from sliding from platform 3.

FIG. 9 shows handle 9 again lowered with drum 33 positioned so that its center of gravity is substantially above the wheel carriage 15. Thus the heavy load can be easily transported by means of the handle 9.

MODIFICATION

Figure 10:
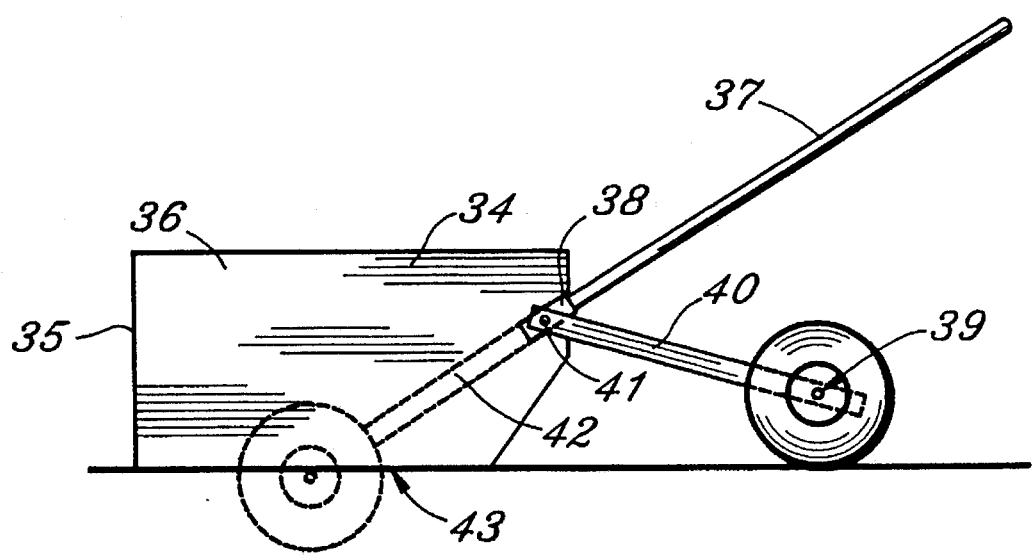
FIG. 10 is a simplified side elevational view of a modification of the invention.

FIG. 10 shows a modified form of the invention. Instead of an L-shaped frame, a container 34, open at the top, is constructed of heavy materials, such as sheet metal, so that it functions also as the frame. Container 34 includes a removable gate 35 constructed as previously described, and a pair of spaced side walls, one of which is seen as 36. A U-shaped handle 37 is attached to container 34 by a pair of brackets 38, one on each sidewall, by inserting the ends of the handle arms into holes in the respective brackets. A wheel carriage 39 is constructed as previously described and pivotably attached to a pair of support legs, one of which is seen at 40. The other ends of the support legs are pivotably attached to the respective brackets 38.

The operation of the modified form of the invention is as previously described. When handle 37 is raised to tip the container, the wheel carriage may swing into the transporting position as indicated by dashed lines 42. The wheel carriage 39 supports the container 34 above a central part of the frame, indicated by reference number 43.

While there is described what is considered to be the preferred embodiment of the invention, other modifications will occur to those skilled in the art, and it is desired to secure in the appended claims all such modifications as fall within the true spirit and scope of the invention.

We claim:

1. A convertible barrow for ground level loading, comprising:
    a frame having a substantially flat platform adapted for resting flat on the ground and receiving a load from substantially ground level to be transported,
    a handle having a pair of handle arms, each one of the handle arms being attached to the frame and extending upwardly and outwardly from the frame, said handle being adapted to be grasped by an operator so as to allow the operator tilt the platform to raise the end of the platform adjacent the operator,
    a wheel carriage having at least two wheels rotatably mounted thereon spaced apart greater than the width of the platform, and
    a pair of support legs each pivotably connected to the barrow at a point above the platform at one end of the respective support legs and pivotably connected to the wheel carriage at the other end thereof, and spaced apart by a width greater than the width of the platform, the length of the support legs being such that the wheel carriage may rest on the ground beneath the handle when the platform is flat on the ground, but may swing beneath one raised end of the platform to a central support section of the platform, wherein the load is supported on the platform above the wheel carriage when transporting the load.

2. The convertible barrow according to claim 1, wherein the frame includes a pair of longitudinal beams supporting said platform, and a pair of uprights extending orthogonally from said longitudinal beams, respectively to provide an L-shaped frame.

3. The convertible barrow of claim 2, wherein each handle arm of the handles is connected to a respective longitudinal beam and to a respective upright, and wherein the support legs are pivotably connected to respective handle arms.

4. The convertible barrow according to claim 2, including load retaining means for preventing the load from slipping off the barrow when the platform is tipped.

5. The convertible barrow according to claim 4, including a container disposed on the frame, the container having side walls and a removable gate, means for holding the container on the frame, said gate and said holding means serving as the load retaining means.

6. The convertible barrow according to claim 4, including a retaining strap connectable between the pair of uprights, said retaining strap serving as the load retaining means.

7. The convertible barrow of claim 1, wherein the support legs connected to the handle arms and are adjustable along the handle arms.

8. The convertible barrow of claim 7, wherein the platform contains markers corresponding to the pivotable connecting of the support legs to the handle arms, so that the support location of the wheel carriage may be predetermined.

9. The convertible barrow according to claim 1, wherein the wheel carriage comprises an axle and a pair of wheels rotatably mounted thereon.

10. The convertible barrow according to claim 1, wherein the wheel carriage comprises a transverse member and having a pair of wheels individually rotatably mounted thereon.

11. The convertible barrow according to claim 1, wherein the frame comprises a container having spaced side walls extending from the platform and a gate which may be opened to receive the load.

12. The convertible barrow according to claim 11, wherein the handle arms are attached to respective spaced side walls.

13. The convertible barrow according to claim 11, wherein the support legs are pivotably connected to the respective spaced side walls.

14. The convertible barrow according to claim 11, and having a pair of brackets each attached to a respective space side wall, each of the brackets being adapted to receive a respective handle arm, and each of the support legs being pivotably connected to a respective bracket.

\* \* \* \* \*

REEXAMINATION CERTIFICATE (3600th)

United States Patent [19]

Hall

[11] B1 5,593,271

[45] Certificate Issued Aug. 11, 1998

[54] CONVERTIBLE BARROW FOR GROUND LEVEL LOADING

[76] Inventor: John R. Hall, 38 Willow La., New Hartford, Conn. 06057

Reexamination Request:
No. 90/004,650, May 27, 1997

Reexamination Certificate for:
Patent No.: 5,593,271
Issued: Jan. 14, 1997
Appl. No.: 630,342
Filed: Apr. 10, 1996

[51] Int. Cl.$^6$ .................................................. B62B 1/04
[52] U.S. Cl. ........................ 414/490; 298/2; 280/43.1; 280/47.21; 280/47.29; 280/43; 414/446
[58] Field of Search ........................... 414/498, 490, 414/475, 476, 444, 446; 298/2, 3, 5, 6; 254/2 R; 280/30, 43, 47, 47.231, 43.1, 47.29, 43.11, 43.17, 47.12, 47.131, 47.17, 47.18, 47.21, 47.3, 47.315, 63, 64, 111

[56] References Cited

U.S. PATENT DOCUMENTS

| | | | |
|---|---|---|---|
| 87,939 | 3/1869 | Ingraham | 280/47.29 |
| 267,357 | 11/1882 | McKernan . | |
| 713,745 | 11/1902 | Butler . | |
| 863,275 | 8/1907 | Haffey | 280/47.21 |
| 910,205 | 1/1909 | Jorgenson . | |
| 1,011,762 | 12/1911 | Doolan . | |
| 1,956,245 | 4/1934 | Moorman et al. | 280/44 |
| 2,096,994 | 10/1937 | Millen | 280/47.21 |
| 2,374,982 | 5/1945 | Davies | 280/47.29 |
| 3,021,625 | 2/1962 | Stasse | 298/2 X |
| 3,033,398 | 5/1962 | Carroll . | |
| 3,380,752 | 4/1968 | Goettl et al. | 280/43 |
| 4,062,591 | 12/1977 | Harris et al. | 298/2 |
| 4,349,210 | 9/1982 | Rutt | 280/47 |
| 4,735,424 | 4/1988 | Stelter, III | 280/47.21 |
| 4,756,540 | 7/1988 | Crawford | 280/47.21 |
| 4,762,333 | 8/1988 | Mortenson | 280/43.1 |

FOREIGN PATENT DOCUMENTS

| | | | |
|---|---|---|---|
| 27584 | 8/1955 | Finland | 61/15 |
| 33978 | 4/1929 | France | 10/1 |
| 973445 | 2/1951 | France | 280/47.21 |
| 975307 | 3/1951 | France | 10/1 |
| 142053 | 9/1953 | Sweden | 63/2 |

OTHER PUBLICATIONS

"Ascender Lift Barrow" product literature.
Damark International, Inc. Catalog, Item #B-7532-463256, p. 2.

*Primary Examiner*—Frank E. Werner

[57] ABSTRACT

A ground-loading conveyance for refuse or heavy objects. The frame is tipped with the handle to allow a two wheel carriage on pivoting support legs to swing beneath the frame, so as to support the load for transporting.

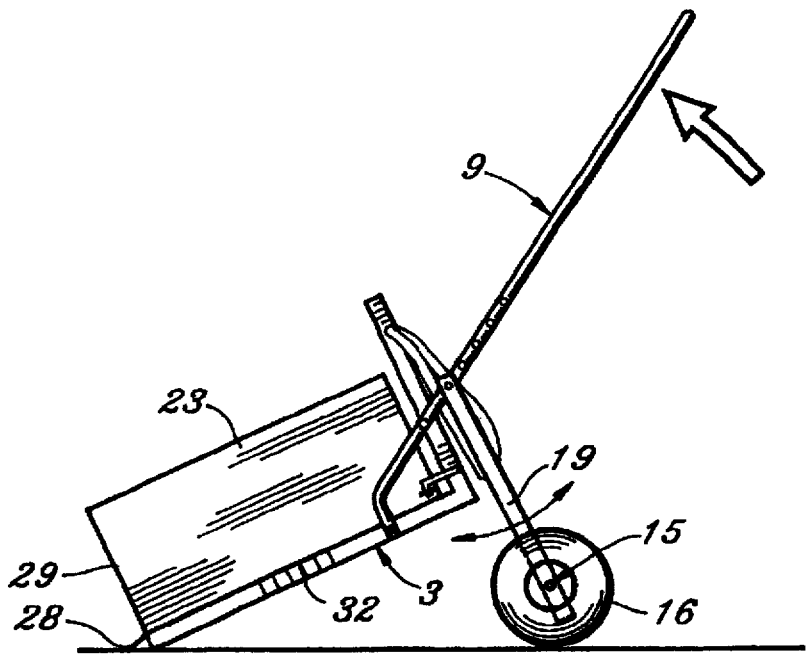

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–13 is confirmed.

Claim 10 is now disclaimed.

Claim 1 is cancelled.

Claims 2, 7, 9, 10 and 14 are determined to be patentable as amended.

Claims 3–6 and 8, dependent on an amended claim, are determined to be patentable.

New claim 15 is added and determined to be patentable.

2. The convertible barrow according to claim [1]*15*, wherein the frame includes a pair of longitudinal beams supporting said platform, and a pair of uprights extending orthogonally from said longitudinal beams, respectively to provide an L-shaped frame.

7. The convertible barrow according to claim [1]*15*, wherein the support legs *are* connected to the handle arms and are adjustable along the handle arms.

9. The convertible barrow according to claim [1]*15*, wherein the wheel carriage comprises an axle and a pair of wheels rotatably mounted thereon.

10. The convertible barrow according to claim [1]*15*, wherein the wheel carriage comprises a transverse member and having a pair of wheels individually rotatably mounted thereon.

14. The convertible barrow according to claim 11, and having a pair of brackets each attached to a respective [space] *spaced* side wall, each of the brackets being adapted to receive a respective handle arm, and each of the support legs being pivotably connected to a respective bracket.

*15. A convertible barrow for ground level loading, comprising:*

*a frame having a substantially flat platform adapted for resting flat on the ground and receiving a load from substantially ground level to be transported,*

*a handle having a pair of handle arms, each one of the handle arms being attached to the frame and extending upwardly and outwardly from the frame, said handle being adapted to be grasped by an operator so as to allow the operator to lift up on the handle to raise an end of the platform adjacent the operator,*

*a wheel carriage having at least two wheels rotatably mounted thereon spaced apart greater than the width of the platform, and*

*a pair of support legs each pivotably connected to the barrow at a point above the platform at one end of the respective support legs and pivotably connected to the wheel carriage at the other end thereof, and spaced apart by a width greater than the width of the platform, the length of the support legs being such that the wheel carriage may rest on the ground beneath the handle when the platform is flat on the ground, but may swing freely beneath the raised end of the platform to a central support section of the platform, wherein the load is supported on a level platform with its center of gravity substantially above the wheel carriage and whereby the load may be transported by substantially only horizontal forces.*

* * * * *